United States Patent [19]

Nakabe et al.

[11] 3,715,471

[45] Feb. 6, 1973

[54] COLOR TELEVISION RECEIVER

[75] Inventors: Ryuhei Nakabe, Hirakata; Seiji Fujisawa; Yasuhiro Sugihara, both of Osaka; Norio Meki, Neyagawa, all of Japan

[73] Assignee: Matsushita Electric Industrial Co., Ltd., Osaka, Japan

[22] Filed: Oct. 9, 1970

[21] Appl. No.: 79,368

[30] Foreign Application Priority Data

Oct. 15, 1969 Japan ................................44/82836
Oct. 15, 1969 Japan ................................44/82838
Dec. 2, 1969 Japan ................................44/97412

[52] U.S. Cl. ..............................................178/5.4 HE
[51] Int. Cl. ..............................................H04n 9/12
[58] Field of Search ..........................178/5.4, 5.4 HE

[56] References Cited

UNITED STATES PATENTS 3,525,802 8/1970 Whiteneir, Jr. .................178/5.4 HE

*Primary Examiner*—Richard Murray
*Attorney*—Stevens, Davis, Miller & Mosher

[57] ABSTRACT

In a television receiver which receives color television signals including a carrier chrominance signal; in order to compensate for the out-of-phase condition of a carrier chrominance signal and errors in hue in broadcasting, transmitting and receiving systems, a pulse timed to a signal of a specified phase angle and phase width among carrier chrominance signals is generated and used as a reference signal for continuously or partially phase-shifting a 3.58 $MH_Z$ continuous wave, thereby securing a specified hue of demodulated color signals.

5 Claims, 16 Drawing Figures

R. NAKABE, S. FUJISAWA, Y. SUGIHARA AND N. MEKI
INVENTORS

BY Stevens, Davis, Miller & Mosher
ATTORNEYS

COLOR TELEVISION RECEIVER

The present invention relates to a color television receiver or more particularly to the automatic hue control of a color television receiver, and its object is to "-gate" a carrier chrominance signal by means of a pulse of a specified phase angle and phase width, which signal is used as a reference signal to correct exactly an "out-of-a-hue" condition due to the phase distortion in the transmission system, etc., thereby to reproduce an image of the right color on the screen. This invention features the use of a pulse as a gate signal, and therefore it is advantageous in that, for example, a subcarrier chrominance signal of a fixed width and amplitude can be picked up in the neighborhood of the flesh tint, which makes it possible to correct a hue exactly.

The above and other object, features and advantages will be made apparent by the detailed description taken in conjunction with the accompanying drawings, in which.

Figure 2:
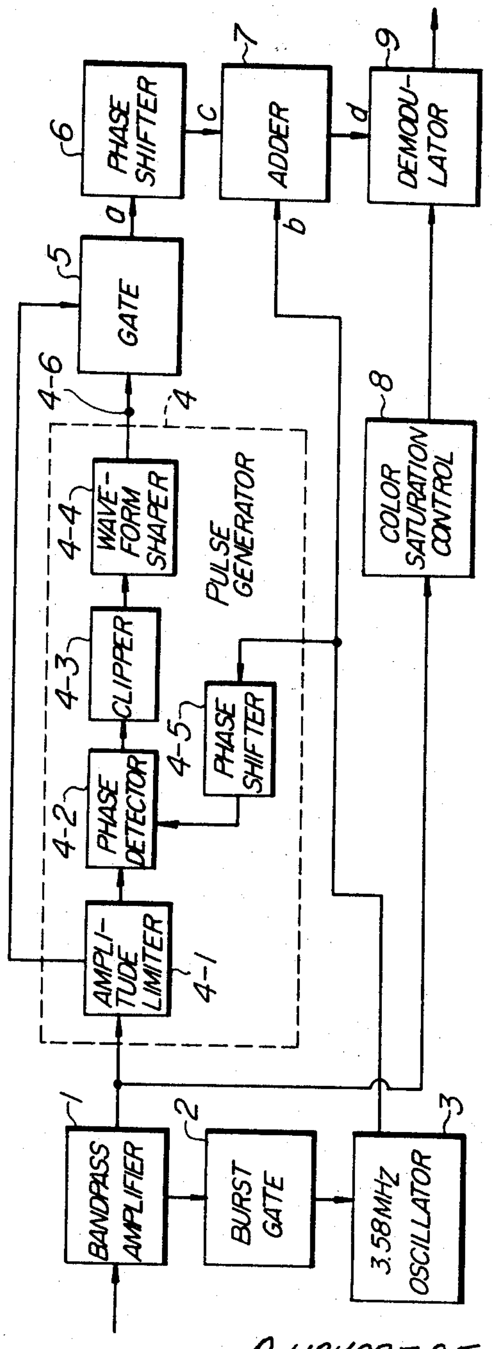
FIG. 2 shows a circuit diagram illustrating an automatic hue control device of a color television receiver embodying the present invention.
Figure 3A:
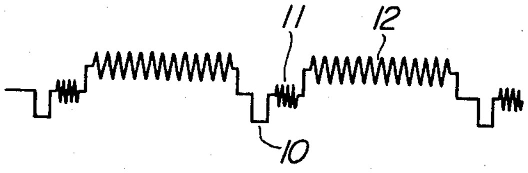
Figure 3B:
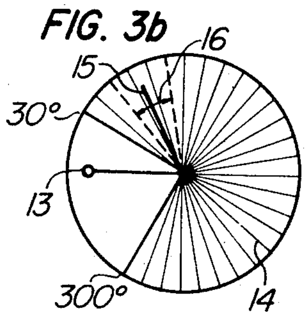
Figure 9:
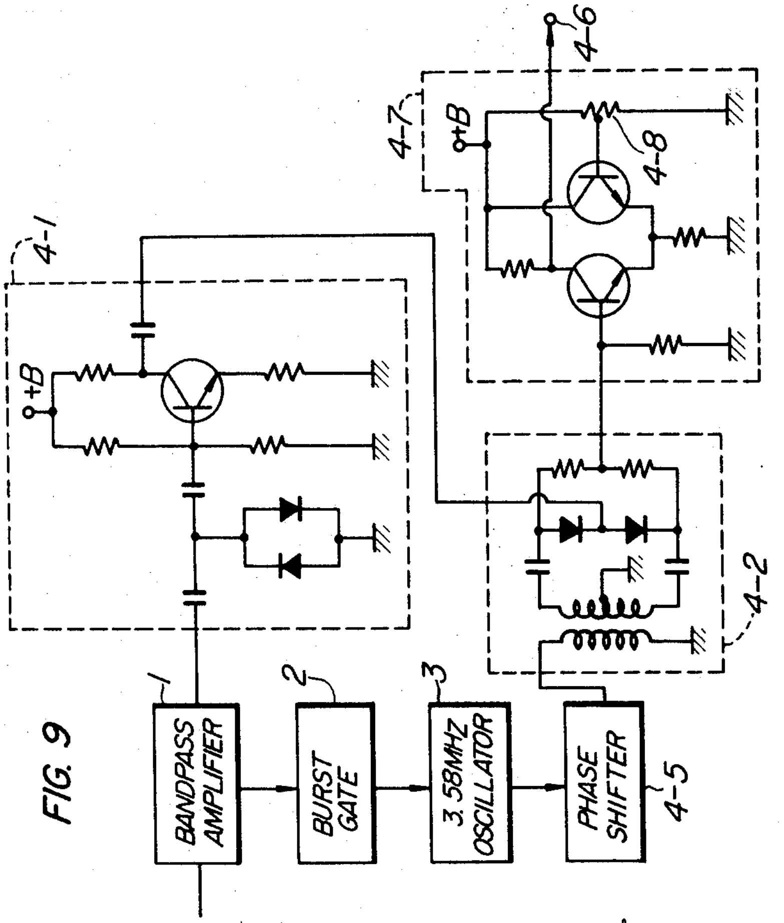
Figures 8A, 8B:
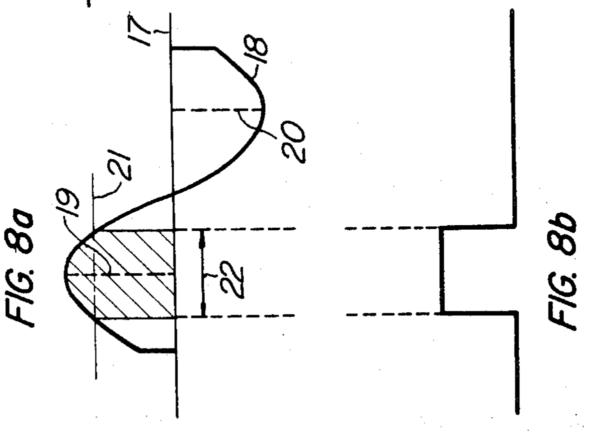
Figure 10:
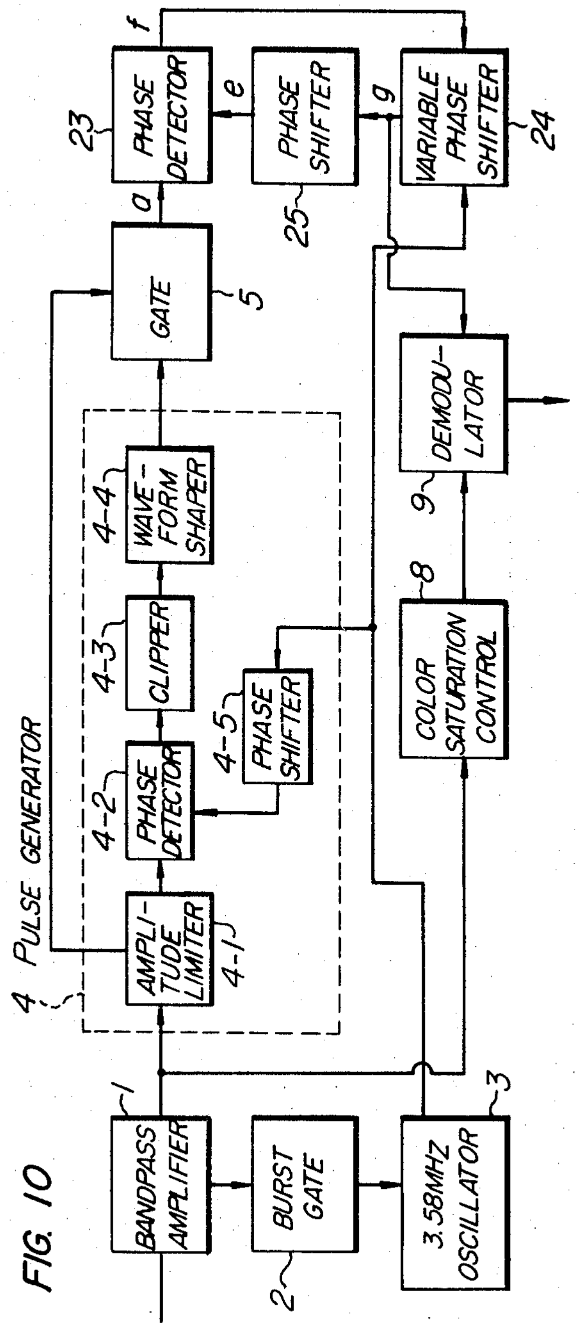
Figure 11:
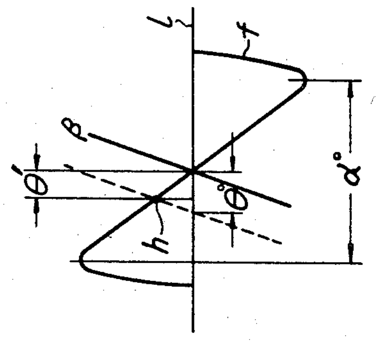
Figures 12, 13:
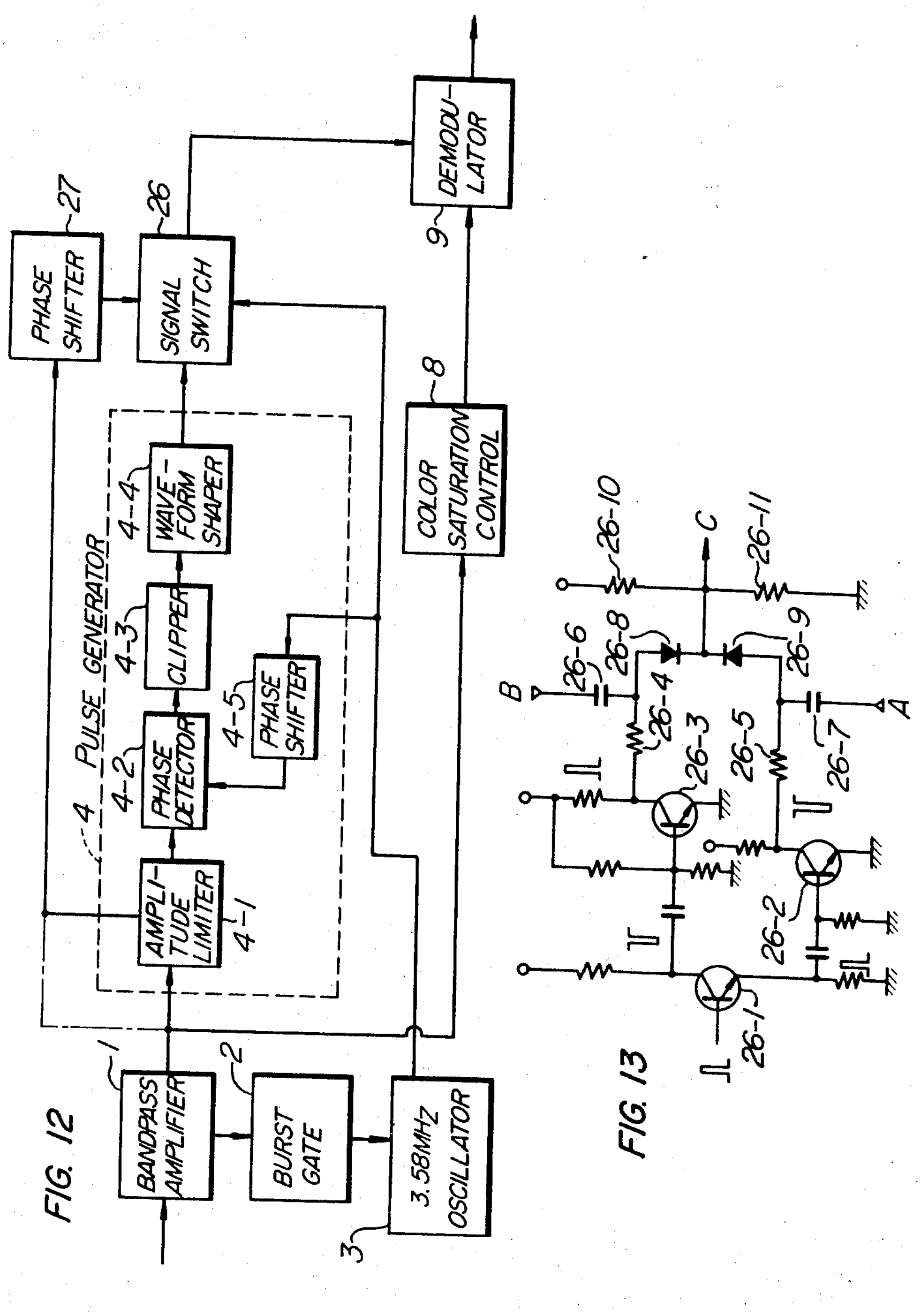

FIGS. 3*a* and 3*b* show a waveform and a vector for giving an explanation of the above-mentioned hue control device;

FIGS. 4, 5*a*, 5*b*, 6 and 7 show vectors for explaining the above-mentioned hue control device according to the present invention;

FIGS. 8*a* and 8*b* show waveforms for explaining the hue control device illustrated in FIG. 2;

FIG. 9 is a diagram showing an actual example of a circuit of the hue control device shown in FIG. 2;

FIG. 10 is a circuit diagram showing another embodiment of the present invention;

FIG. 11 is a diagram showing the characteristics of the hue control device of FIG. 10;

FIG. 12 shows still another embodiment of the present invention; and

FIG. 13 is a detailed circuit diagram showing a part of the hue control device of FIG. 12.

In the conventional automatic hue control device, the output of the bandpass amplifier 1P is applied through the color saturation control 2P to the demodulator 3P and simultaneously to the burst gate circuit 4P, where a burst signal only is picked up. Using this burst signal as a reference, the 3.58 $MH_Z$ oscillator 5P is energized and the resulting output is employed for demodulation. However, in such a system, the disadvantage is that correct hue control is impossible because of variations in hue due to phase distortion for various reasons including the distortion of a differential phase in the signal transmission system, an error in camera adjustment, an out-of-phase condition of a burst signal transmitted by the broadcasting station, phase characteristics of the receiver antenna, etc., and a phase distortion of 3.58 $MH_Z$ continuous wave due to the temperature characteristics of a crystal or oscillator in the receiver.

The present invention is aimed at obviating these disadvantages and will be readily become apparent from the following description of the embodiments:

Referring now to FIG. 2 showing an embodiment of the present invention, numeral 1 shows a bandpass amplifier, numeral 2 a burst gate circuit, numeral 3 a 3.58 $MH_Z$ oscillator, numeral 4 a pulse generator for generating a pulse of a specified hue (phase) and hue width (phase width) and which is timed to a carrier chrominance signal, numeral 5 a gate circuit for "-gating" a carrier chrominance signal of a limited amplitude from the amplitude limiter 4–1 by a pulse picked up from the pulse shaping device 4—4 in the pulse generator 4 thereby to obtain a carrier chrominance signal of a desired phase angle and phase width, numeral 6 a phase shifter, numeral 7 and adder for adding vectorially the gated carrier chrominance signal from the phase shifter 6 and the 3.58 $MH_Z$ continuous wave from the 3.58 $MH_Z$ oscillator 3, numeral 8 a color saturation control means, and numeral 9 a demodulator. The pulse generator 4 consists of the amplitude limiter 4–1, phase detector 4–2, clipping circuit 4–3, pulse shaping means 4—4 and the phase shifter 4–5 for phase-shifting the output signal from the 3.58 $MH_Z$ oscillator 3. The detailed circuit arrangement of this pulse generator is shown in FIG. 9.

Assume now that a signal of a waveform as shown in FIG. 3*a* and varying in phase continuously from 30° to 300° with respect to a burst signal as shown in FIG. 3*b* is applied to the bandpass amplifier 1. In FIG. 3*a*, numeral 10 shows a synchronizing signal, numeral 11 a burst signal and numeral 12 a carrier chrominance signal whose phase varies continuously over the range from 30° to 300° with respect to the burst signal. This phase relation is shown vectorially in FIG. 3*b*, in which numeral 13 shows a burst signal. The carrier chrominance signal which varies in phase continuously from 30° to 300° with respect to the above-mentioned burst signal is also shown vectorially in numeral 14. With reference to FIG. 2, the above-mentioned signal is applied to the amplitude limiter 4–1 through the bandpass amplifier 1, to fix the amplitude of the signal. On the other hand, the output of the 3.58 $MH_Z$ oscillator 3 is set at a desired phase angle through the phase shifter 4–5. Both of the above signals are applied to the phase detector 4–2 for phase detection. If a phase relation as shown by numeral 15 in FIG. 3*b* is developed by the phase shifter 4–5, the output of the phase detector 4–2 becomes maximum in amplitude at the point where the phase of a carrier chrominance signal agrees with that of the 3.58 $MH_Z$ continuous wave phase-shifted as shown in FIG. 8*a*. And its amplitude is sinusoidally attenuated more as the carrier chrominance signal becomes more out of phase with the 3.58 $MH_Z$ continuous wave, the maximum negative amplitude appearing at a point 180° out of phase with the 3.58 $MH_Z$ continuous wave phase-shifted.

In FIG. 8*a*, numeral 17 shows a reference level, the abscissa showing the time. Numeral 18 shows the output of the phase detector with respect to the reference level, and numeral 19 the position to which the 3.58 $MH_Z$ continuous wave is phase-shifted, and at this position the detector output is maximum. This waveform is clipped by the clipping circuit 4–3 at line 21, for example, as shown in FIG. 8*a* and shaped by the pulse shaping means 4—4, thereby producing a pulse as shown in FIG. 8*b*. The portion of the pulse shown by numeral 22 corresponds to the phase width shown by numeral 16 in FIG. 3*b*. This pulse width can be varied by changing the clipping level.

Figure 1:
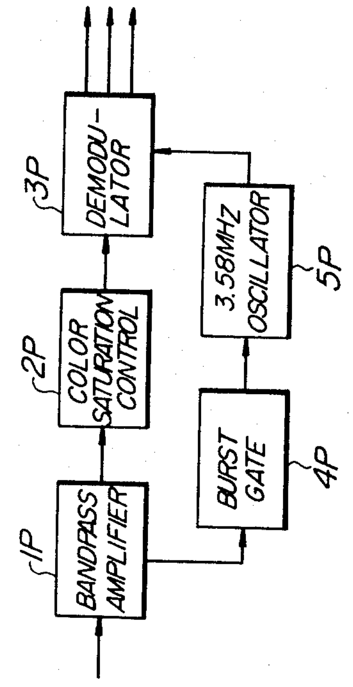
FIG. 1 PRIOR ART
FIG. 1 shows a circuit diagram illustrating an automatic hue control device of a conventional color television receiver.

FIG. 9 shows an example of a detailed circuit of the pulse generator 4, in which numeral 1 shows the bandpass amplifier already shown in FIG. 1, numeral 2 a burst gate circuit and numeral 3 a 3.58 $MH_z$ oscillator, the output of which is of course in synchronism with the burst signal. Numeral 4–5 shows a phase shifter for shifting the phase of the output signal of the 3.58 $MH_z$ oscillator 3, numeral 4–1 an amplitude limiter which, in this case, utilizes the forward direction curve of a diode in producing a limiter effect. If several stages of this circuit are employed, the limiter effect can be improved. Numeral 4–2 shows a phase detector which, in this case, employs a method of diode detection. Numeral 4–7 shows a clipping circuit doubling as a pulse shaping means, at the output terminal 4–6 of which is obtained a pulse equivalent in timing to a carrier chrominance signal of a desired phase angle and a certain phase width. Incidently, the emitter potential can be changed equivalently by controlling the variable resistor 4–8, resulting in a variation in the clipping level and hence in pulse width.

Figure 4:
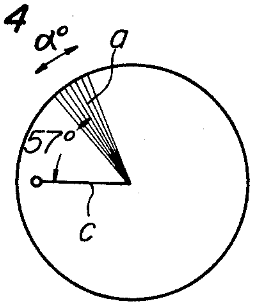
Figure 5A:
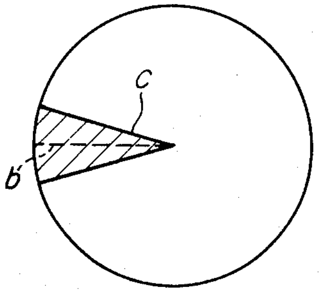
Figure 5B:
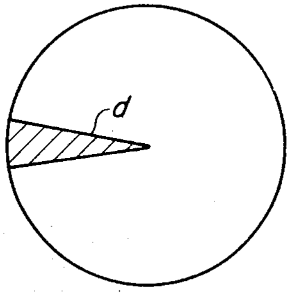

When the television signal as shown in FIG. **3*a* is applied to the bandpass amplifier 1, the pulse as shown in FIG. 8*b* is produced at the output terminal 4–6 of the pulse generator 4 and a carrier chrominance signal limited in amplitude is obtained from the amplitude limiter 4–1, as described above. With a pulse from the pulse generator 4 as a gate signal, a carrier chrominance signal limited in amplitude is gated through the gate circuit 5, and then a carrier chrominance signal of a specified phase width $\alpha°$ as shown in FIG. 4 is obtained. If the phase shifter 4–5 is controlled in such a manner that said gate signal agrees with the flesh tint signal which is 57° behind the burst signal 13, a signal in the neighborhood of the flesh tint signal with its amplitude limited appears as the output of the gate circuit 5**. (This particular signal is referred to as "signal *a*" hereinafter.) This signal *a* is shifted to the same phase as that of the 3.58 $MH_z$ continuous wave from the 3.58 $MH_z$ oscillator 3 by the phase shifter 6, and then FIG. **5*a*** is obtained. (The 3.58 $MH_z$ continuous wave is referred to as signal *b*, and the signal, to the phase of which signal *a* is shifted, as signal *c*, hereinafter). The shaded area in FIG. **5*a*** indicates signal *c* and the dotted line the vector of signal *b*. When signals *b* and *c* are added vectorially by the adder 7, the output of the adder 7 is the vectorial sum of the two signals, which is shown by the shaded area in FIG. **5*b***. The phase of this signal changes if a signal of a hue near the flesh tint is present. (The above-mentioned signal of the vectorial sum is referred to as signal *d*.)

Figure 6:
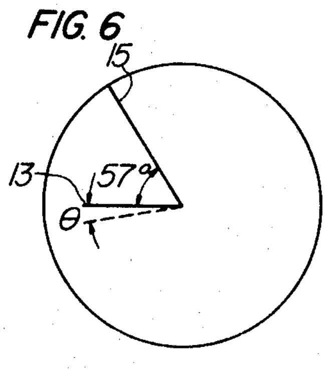

Suppose that, as shown in FIG. 6, only the flesh tint signal 15 in addition to the burst signal 13 (the flesh tint signal being 57° behind the burst signal) is applied to the bandpass amplifier 1. Then the pulse generator 4 produces a signal which appears as signal *a* at the output terminal of the gate circuit 5. Since signal *a* is brought into synchronism with signal *b* by the phase shifter 6, the phase of the output of the adder 7 remains unchanged.

Figure 7:
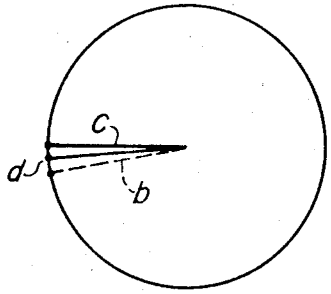

Even if the phase of the burst signal is changed to the position as shown by the dotted line in FIG. 6 for some reason, signal *a* is still produced if such a change is within $\alpha°/2$ of the normal position, because, as described earlier, the gate circuit 5 produces signal *a* of a phase width of $\pm\alpha°/2$ with respect to the flesh tint signal. Signal *a* thus generated is converted into signal *c* by the phase shifter 6. However, signal *b* applied to the adder 7 faithfully reflects the change in phase of the burst signal. The above phase relation is shown in FIG. 7. The output of the adder 7, or signal *d*, represents the vectorial sum of signals *b* and *c* as shown in FIG. 7. Signal *d* is applied to the demodulator 9 to which the flesh tint signal as shown in FIG. 6 is also applied from the bandpass amplifier 1 through the color saturation control means 8. Generally, the output of a demodulator of the carrier-balance type is not affected by the variations in the 3.58 $MH_z$ continuous wave, the amplitude of which is made sufficiently high. In this way, the adder 7 suppresses the condition in which signal *b* becomes out of phase due to the phase change of the burst signal and as a result a color signal corresponding to a hue near the flesh tint can be obtained as the output of the demodulator 9. If the phase width of a carrier chrominance signal exceeds the phase width 16 of the pulse from the pulse generator circuit 4, the output of the adder 7 to be applied to the modulator 9 is determined solely by signal *b* and therefore no change in the color signal results. As is clear from the above description, a variation in hue due to a change in phase of the burst signal transmitted by the broadcasting station or an error in camera adjustment can be corrected by arranging the circuit in such a manner that the phase of the 3.58 $MH_z$ continuous wave applied to the demodulator 9 varies, as to the hues in the neighborhood of the flesh tint.

Another embodiment of the present invention is shown in FIG. 10, in which numeral 23 shows a phase detector, numeral 25 a phase shifter, and numeral 24 a variable phase shifter for varying the phase according to the output signal of the phase detector 23. The circuits 1, 2, 3, 4, 5, 8 and 9 are the same as those shown by the same numerals respectively in the foregoing embodiment.

The operation of this circuit is explained below. Assume now that a signal as shown in FIG. **3*a* is applied to the bandpass amplifier 1. Then, it is obvious from the earlier description that a signal of a hue width (phase width) as shown in FIG. 4 is obtained as the output of the gate circuit 5**. If this signal and signal *e* at right angles to it are used for phase detection, the output *f* is produced from the phase detector 23, as shown in FIG. 11. In this figure, the abscissa shows the phase and the ordinate the voltage. The output of the phase detector 23 is at the reference level *l* when the signal a is in phase with the flesh tint signal, while its positive or negative value becomes higher as the signal a goes further away from the flesh tint, becoming maximum in amplitude when out of phase by $\alpha°/2$. Beyond $\alpha°/2$, signal *a* does not appear and therefore the output of the phase detector 23 is restored to the reference level. On the other hand, the 3.58 $MH_z$ continuous wave from the 3.58 $MH_z$ oscillator 3 is applied to the variable phase shifter 24, the output of which varies in phase with said phase detection voltage *f* as a controlling voltage. The control characteristics of the variable phase shifter 24 are shown by $\beta$ in FIG. 11. Numeral 25 shows a fixed phase shifter for shifting the phase of signal *g* which has been controlled by the variable phase shifter 24. In other words, the phase shifter 25 is provided to produce signal *e* at right angles to signal *a* when the controlling voltage *f* of the variable phase shifter 24 is at the reference level *l*. The phase detector 23 and variable phase shifter 24 constitute a conventional AFPC circuit. Assume that a burst signal and flesh tint signal as shown in FIG. 6 are applied to the bandpass amplifier 1. Then, the controlling voltage *f* stays at the reference level if the burst signal and the flesh tint signal are in a normal phase relation, and hence the variable phase shifter 24 is not controlled, thereby producing signal *g* of a certain phase.

In the next place, assume that the burst signal becomes out of phase with the flesh tint signal by $\theta$ degree as shown by the dotted line in FIG. 6 Then the voltage *h* as shown in FIG. 11 is generated at the output terminal of the phase detector 23, which voltage controls the variable phase shifter 24 thereby to suppress the out-of-phase condition to the amount of $\theta'$. On the other hand, if the burst signal is at a normal phase position and the flesh tint signal becomes out of phase by $\theta$, for example, due to an error in camera adjustment, etc., the output voltage *h* of the phase detector 23 is generated as in the previous case, thereby controlling the variable phase shifter 24 to transfer the phase of the output *g* from $\theta$ to $\theta'$. That is to say, the output *g* of the variable phase shifter 24 is phase-controlled by signal *a* from the gate circuit 5 and applied to the demodulator 9, whereby an out-of-phase condition of the burst signal for some reason attributable to the broadcasting station or a variation in hue due to the maladjustment of the camera is faithfully corrected in the output color signal of the demodulator 9 as far as the flesh tint and hues in its vicinity are concerned. Incidently, by increasing the response speed of the loop consisting of the circuits 23, 24 and 25, only that portion of phase which is gated at the gate circuit 5 can be controlled, while, by setting the response speed at a low level, the phase of the image as a whole can be controlled.

A third embodiment of the present invention is shown in FIG. 12, in which numeral 26 shows a signal switching device, and numeral 27 a phase shifting circuit. The circuits of numerals 1, 2, 3, 4, 8 and 9 are the same respectively as those shown by the same numerals in FIG. 2.

The operation of this embodiment is explained below. A pulse of a desired phase angle and phase width as shown in FIG. 8*b* among the carrier chrominance signals obtained at the pulse generator 4 is applied to the signal switching device 26. At the same time, the output of the 3.58 $MH_Z$ oscillator 3 is applied to the signal switching device 26. In addition, part of the output of the amplitude limiter 4–1 or bandpass amplifier 1 is applied to it through the phase shifter 27. This signal switching device 26 passes the output of the 3.58 $MH_Z$ oscillator 3 in the absence of the output of the waveform shaping circuit 4—4, while it passes the output of the amplitude limiter 4–1 or bandpass amplifier when there is an output of the waveform shaping circuit 4—4. The resulting output of the signal switching device 26 as well as the output of the bandpass amplifier 1 is applied to the demodulator 9 for demodulation.

Suppose that the above-mentioned desired phase angle is that of the flesh tint which is 57 degree behind the phase angle of a burst signal. If the output of the 3.58 $MH_Z$ oscillator 3 is exactly in phase with the burst signal, the shifting of the 3.58 $MH_Z$ continuous wave by 57° at the phase shifter 4–5 enables a pulse to be generated at the output terminal of the waveform shaping circuit 4—4 when a signal corresponding to the flesh tint or hues in its vicinity arrives. On the other hand, the phase of the output of the amplitude limiter 4–1 or bandpass amplifier 1 is advanced by 57 degree by the phase shifter 27, and the phase-shifted signal is applied to the demodulator 9 as a subcarrier signal through the signal switching device 26 when the pulse appears at the output of the wave form shaping circuit 4—4. Therefore the flesh tint signal appears at the demodulator 9 as long as a pulse is generated at the output terminal of the waveform shaping circuit 4—4. As a result, the flesh tint is faithfully reproduced by providing a phase width of, say, 15°, even if the burst signal changes in phase within 15° due to distortion in the transmission system.

Now referring to the detailed circuit of the signal switching device 26 shown in FIG. 13, numeral 26–1 shows a polarity dividing transistor which produces at its emitter a pulse of the same phase as that of the pulse from its base but produces a pulse of the reverse polarity at its collector. Incidentally, the pulse applied to the base of this transistor is the one produced by the waveform shaping circuit 4—4 as shown in FIG. 12. The outputs of the collector and emitter of transistor 26–1 are applied to the pulse amplifiers 26–3 and 26–2 respectively. The bias of the pulse amplifier 26–2 is set in such a manner that it is cut off in the absence of a pulse from the transistor 26–1, while the bias of the pulse amplifier 26–3 is such that it is energized in the absence of a pulse from the transistor 26–1. The outputs of the pulse amplifiers 26–3 and 26–2 are respectively applied through the resistors 26–4 and 26–5 to the diodes 26–8 and 26–9. The output of the 3.58 $MH_Z$ oscillator 3 is supplied from point A through the capacitor 26–7 and the phase-shifted chrominance signal is supplied from point B through the capacitor 26–6. The resistors 26–10 and 26–11 are for providing an appropriate bias to the diodes 26–8 and 26–9, the outputs of said resistors appearing at point C. In this fashion, when a pulse is not supplied, the diode 26–8 is not made to conduct as the collector potential of the pulse amplifier 26–3 is low, while the diode 26–9 conducts since the collector potential of the pulse amplifier 26–2 is high, thereby to produce 3.58 $MH_Z$ continuous wave as an output. On the other hand, when a pulse is supplied, the diode 26–8 conducts and the diode 26–9 is cut off, thereby producing the phase-shifted carrier chrominance signal as an output. In place of the resistors 26–4 and 26–5 which are inserted for the purpose of preventing the attenuation of signals from points A and B, inductances may be used.

What is claimed is:

1. A color television receiver for receiving a signal having carrier chrominance and burst components comprising a. a bandpass amplifier;

b. a pulse generator for generating an output pulse only when said carrier chrominance signal component at the output of said bandpass amplifier is within a predetermined phase range including a specific phase with respect to the phase of said burst signal component;

c. a subcarrier oscillator for generating a continuous subcarrier in synchronism with said burst signal component;

d. phase shifting means for shifting the phase of said subcarrier by the output pulse of said pulse generator; and e. a demodulator for demodulating said carrier chrominance signal component by means of the subcarrier phase-shifted by said phase shifting means.

2. A color television receiver according to claim 1, in which said phase shifting means comprises a gate circuit for passing therethrough said carrier chrominance signals from said bandpass amplifier only when said pulse generator produces an output, a phase shifter for phase shifting the output signal of said gate circuit by a specified phase angle, an adder for adding the output of said phase shifter to said subcarrier coming from said subcarrier generator, and means for applying the output of said adder to said demodulator.

3. A color television receiver according to claim 1 in which said phase shifting means comprises a gate circuit for passing therethrough said carrier chrominance signals from said bandpass amplifier only when said pulse generator produces an output, a variable phase shifter for phase-shifting said subcarrier, another phase shifter for phase-shifting a first output signal of said variable phase shifter by a certain angle, a phase detector circuit for phase-detecting the output of said gate circuit by means of an output signal of said another phase shifter, means for controlling the phase angle shifted by said variable phase shifter by means of the output of said phase detector circuit, and means for applying a second output signal of said variable phase shifter to said demodulator.

4. A color television receiver according to claim 1, in which said phase shifting means comprises a signal switch passing therethrough said carrier chrominance signal from said bandpass amplifier when said pulse generator produces an output and said subcarrier from said subcarrier generator when said pulse generator does not produce an output, and means for applying the output of said signal switch to said demodulator.

5. A color television receiver according to claim 1, in which said pulse generator comprises an amplitude limiter circuit for limiting the amplitude of said carrier chrominance signal from said bandpass amplifier, a phase shifter circuit for phase-shifting said subcarrier to a specified phase, a phase detector circuit for phase-detecting the output signal of said amplitude limiter circuit by the output signal of said phase shifter circuit, a clipping circuit for clipping the output signal of said phase detector circuit, and a circuit for shaping and amplifying the output of said clipping circuit.

* * * * *